US007648682B2

(12) United States Patent
McDermott et al.

(10) Patent No.: US 7,648,682 B2

(45) Date of Patent: Jan. 19, 2010

(54) WICK SYSTEMS FOR COMPLEXED GAS TECHNOLOGY

(75) Inventors: Wayne Thomas McDermott, Fogelsville, PA (US); Daniel Joseph Tempel, Macungie, PA (US); Philip Bruce Henderson, Allentown, PA (US); Ronald Martin Pearlstein, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 484 days.

(21) Appl. No.: 11/743,925

(22) Filed: May 3, 2007

(65) Prior Publication Data

US 2007/0217967 A1 Sep. 20, 2007

Related U.S. Application Data

(63) Continuation-in-part of application No. 10/887,561, filed on Jul. 8, 2004, now Pat. No. 7,396,381.

(51) Int. Cl.
*B01D 50/00* (2006.01)
*B01D 53/02* (2006.01)
*B01D 19/00* (2006.01)

(52) U.S. Cl. ........................... 422/168; 137/14; 95/148; 96/155

(58) Field of Classification Search ................. 422/168, 422/211; 137/14; 85/148; 96/155
See application file for complete search history.

(56) References Cited

U.S. PATENT DOCUMENTS 4,471,014 A * 9/1984 den Hartog et al. ......... 428/182
4,744,221 A 5/1988 Knollmueller
4,788,825 A 12/1988 Calupca et al.
5,518,528 A 5/1996 Tom et al.
5,761,910 A 6/1998 Tom
5,851,270 A 12/1998 Olander
5,917,140 A 6/1999 Tom
5,985,008 A 11/1999 Tom et al.
5,993,766 A 11/1999 Tom et al.
6,012,453 A * 1/2000 Tsals et al. ............. 128/201.21
6,027,547 A 2/2000 Tom et al.
6,101,816 A 8/2000 Wang et al.
6,110,257 A 8/2000 Tom
6,132,492 A 10/2000 Hultquist et al.

(Continued)

FOREIGN PATENT DOCUMENTS

CN 86203578 3/1987

(Continued)

*Primary Examiner*—Walter D Griffin
*Assistant Examiner*—Natasha Young
(74) *Attorney, Agent, or Firm*—Lina Yang

(57) ABSTRACT

The invention relates to an improvement in apparatus and process for effecting storage and delivery of a gas. The storage and delivery apparatus is comprised of a storage and dispensing vessel containing a medium capable of storing a gas and permitting delivery of the gas stored in the medium from the vessel, the improvement comprising:

(a) a reactive liquid having Lewis acidity or basicity;
(b) a gas liquid complex in a reversible reacted state formed under conditions of pressure and temperature by contacting the gas having Lewis acidity with the reactive liquid having Lewis basicity or the gas having Lewis basicity with the reactive liquid having Lewis acidity;
(c) a non-reactive wick medium holding and dispersing the reactive liquid and the gas liquid complex therein.

25 Claims, 3 Drawing Sheets

U.S. PATENT DOCUMENTS

| | | | |
|---|---|---|---|
| 6,500,238 | B1 | 12/2002 | Brandes et al. |
| 6,557,591 | B2 | 5/2003 | Pearlstein et al. |
| 7,172,646 | B2 | 2/2007 | Tempel et al. |
| 2001/0031539 | A1 | 10/2001 | Uhlenbrock et al. |
| 2002/0055242 | A1 | 5/2002 | Uhlenbrock et al. |
| 2003/0033930 | A1 | 2/2003 | Tom et al. |
| 2004/0206241 | A1 * | 10/2004 | Tempel et al. ................. 96/155 |

FOREIGN PATENT DOCUMENTS

| | | | |
|---|---|---|---|
| CN | 86207903 | | 11/1987 |
| EP | 1486458 | A2 | 12/2004 |
| EP | 1 647 761 | A | 4/2006 |
| FR | 2011354 | | 2/1970 |
| JP | 11-264500 | A | 9/1999 |
| JP | 2004-507699 | A | 3/2004 |
| WO | 97/44118 | A | 11/1997 |
| WO | 00/36335 | A1 | 6/2000 |
| WO | 0211861 | A1 | 2/2002 |

* cited by examiner

WICK SYSTEMS FOR COMPLEXED GAS TECHNOLOGY

CROSS-REFERENCE TO RELATED APPLICATION

The present application is a continuation-in-part of application Ser. No. 10/887,561 filed 8 Jul. 2004, now U.S. Pat. No. 7,396,381.

BACKGROUND OF THE INVENTION

Many processes in the semiconductor industry require a reliable source of process gases for a wide variety of applications. Often these gases are stored in cylinders or vessels and then delivered to the process under controlled conditions from the cylinder. The semiconductor manufacturing industry, for example, uses a number of hazardous specialty gases such as phosphine ($PH_3$), arsine ($AsH_3$), and boron trifluoride ($BF_3$) for doping, etching, and thin-film deposition. These gases pose significant safety and environmental challenges due to their high toxicity and pyrophoricity (spontaneous flammability in air). In addition to the toxicity factor, many of these gases are compressed and liquefied for storage in cylinders under high pressure. Storage of toxic gases under high pressure in metal cylinders is often unacceptable because of the possibility of developing a leak or catastrophic rupture of the cylinder.

One recent approach to storage and delivery of Lewis acid and Lewis base gases (e.g., $PH_3$, $AsH_3$, and $BF_3$) resides in the complex of the Lewis base or Lewis acid in a reactive liquid of opposite Lewis character, e.g., an ionic liquid (e.g., a salt of alkylphosphonium or alkylammonium) of opposite Lewis character. Such liquid adduct complexes provide a safe, low pressure method of storage, transporting and handling highly toxic and volatile compounds.

The following reference illustrates a delivery apparatus for Lewis basic and acidic gases from reactive liquids and proposed mechanisms for the formation of Lewis complexes of Lewis gases with reactive liquids and for recovering the gases from the reactive liquids and delivering the respective gases to the onsite facility.

U.S. Pat. No. 7,172,646 (the subject matter of which is incorporated by reference) discloses a process for storing Lewis base and Lewis acidic gases in a nonvolatile, reactive liquid having opposing Lewis acidity or Lewis basicity. Preferred processes employ the storage and delivery of arsine, phosphine and $BF_3$ in an ionic liquid.

Complexed gas technology presently utilizes a volume of bulk reactive liquid contained in a cylindrical vessel. The vessel may be oriented horizontally or vertically during use. The liquid is prevented from exiting the vessel by a gas/liquid separator barrier device. The separator may, for example, contain a thin, microporous membrane designed to allow passage of gas while preventing liquid passage out of the vessel. This apparatus suffers from operational limitations such as: a potential for minute liquid leakage through the microporous phase barrier to the outside, a potential for membrane rupture leading to substantial liquid release to the outside, a requirement to keep the vent positioned in the gas space of the vessel during use regardless of vessel orientation, a potential for increased flow restriction through the membranous phase barrier due to liquid or solid deposits on the membrane, a potential for flow and pressure fluctuations during gas delivery due to sub-surface hydrodynamic effects such as bubbling and convective liquid flow in the bulk liquid volume, and a relatively small ratio of free surface to volume in the bulk liquid leading to a limited interfacial mass transfer rate leading to (1) a limited rate of gas complexation, (2) a limited rate of gas fragmentation and (3) incomplete fragmentation or delivery of gas product.

BRIEF SUMMARY OF THE INVENTION

The invention relates to an improvement in apparatus and process for effecting storage and delivery of a gas. The storage and delivery apparatus is comprised of a storage and dispensing vessel containing a medium capable of storing a gas and permitting delivery of the gas stored in the medium from the vessel, the improvement comprising:

(a) a reactive liquid having Lewis acidity or basicity;

(b) a gas liquid complex in a reversible reacted state formed under conditions of pressure and temperature by contacting the gas having Lewis acidity with the reactive liquid having Lewis basicity or the gas having Lewis basicity with the reactive liquid having Lewis acidity;

(c) a non-reactive wick medium holding and dispersing the reactive liquid and the gas liquid complex therein.

Several advantages can be achieved through the process described here and some of these include:

an ability to facilitate faster complexing of the gas with the reactive liquid; and, an ability to effect faster and more efficient withdrawal and recovery of gas from the reactive liquid.

DETAILED DESCRIPTION OF THE INVENTION

Figures 1, 1A:
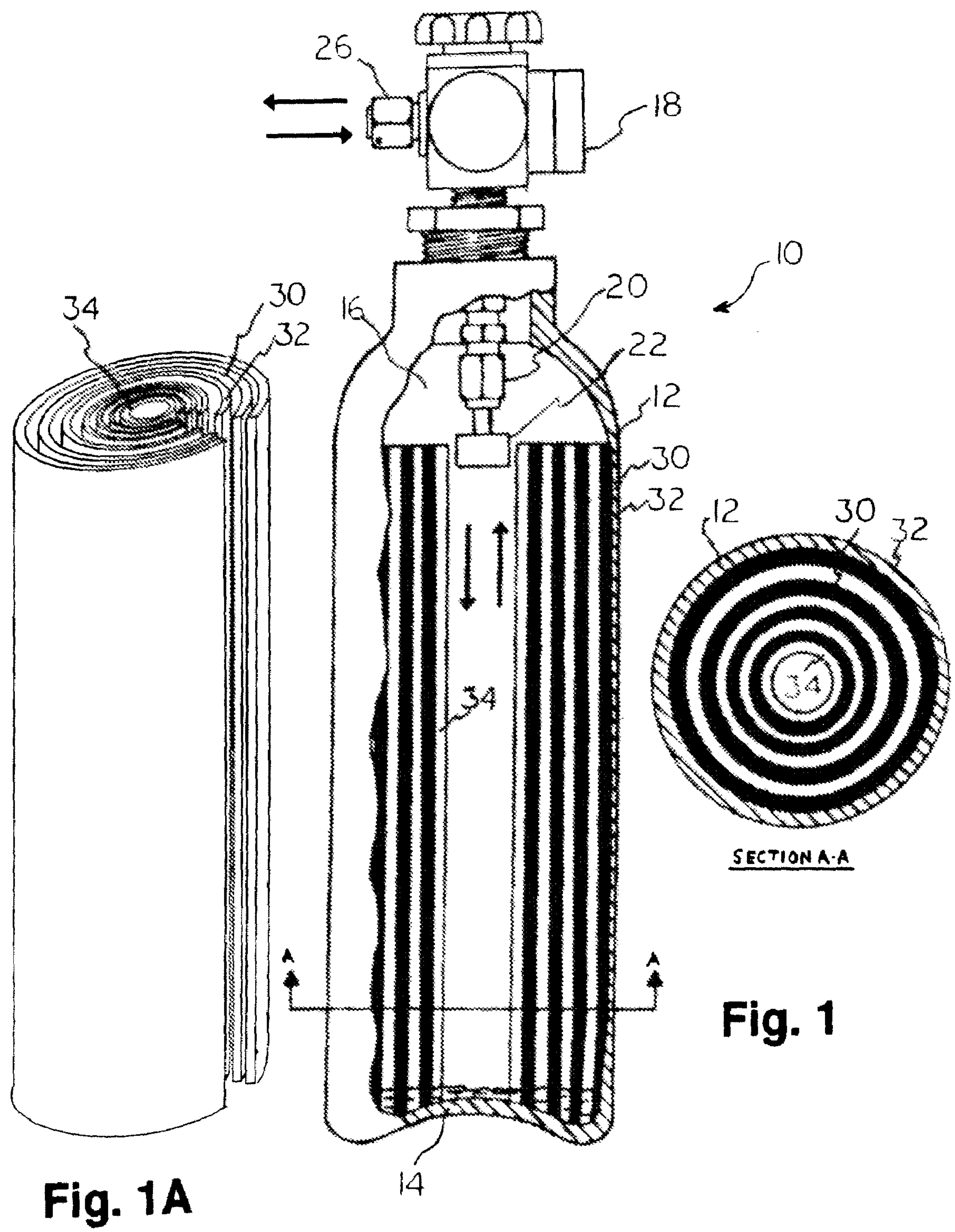
FIGS. 1 and 1A are views of an apparatus for effecting formation of complexes and for recovery of Lewis gases with reactive liquids of opposite Lewis character using a layered cylindrical wick.

In one type of low-pressure storage and delivery apparatus, gases having Lewis basicity or acidity, particularly hazardous specialty gases such as phosphine, arsine and boron trifluoride which are utilized in the electronics industry, are stored as a complex in a continuous liquid medium. A reversible reaction is effected between the gas having Lewis basicity with a reactive liquid having Lewis acidity and, alternatively, a gas having Lewis acidity with a reactive liquid having Lewis basicity (sometimes herein referred to as having opposing Lewis character) resulting in the formation of a complex.

In these storage and delivery apparatuses a suitable reactive liquid having low volatility and preferably having a vapor pressure below about $10^{-2}$ Torr at 25° C. and, more preferably, below $10^{-4}$ Torr at 25° C. is used. Ionic liquids are representative and preferred as they can act either as a Lewis acid or Lewis base, for effecting reversible reaction with the gas to be stored. The acidity or basicity of the reactive ionic liquids is governed by the identity of the cation, the anion, or by the combination of the cation and anion employed in the ionic liquid. The most common ionic liquids comprise salts of alkylphosphonium, alkylammonium, tetra alkylphosphonium, tetra alkylammonium, N-alkylpyridinium, N,N-dialkylphrrolidinium, or N,N'-dialkylimidazolium cations. Common cations contain C1-18 alkyl groups, and include the ethyl, butyl and hexyl derivatives of N-alkyl-N'-methylimidazolium and N-alkylpyridinium. Other cations include pyridazinium, pyrimidinium, pyrazinium, pyrazolium, triazolium, thiazolium, and oxazolium.

A wide variety of anions can be matched with the cation component of such ionic liquids for achieving Lewis acidity. One type of anion is derived from a metal halide. The halides most often used are chloride and bromide although the other halides may also be used. Preferred metals for supplying the anion component, e.g. the metal halide, include copper, aluminum, iron, zinc, tin, antimony, titanium, niobium, tantalum, gallium, and indium. Examples of metal halide anions are $CuCl_2^-$, $CuBr_2^-$, $CuClBr^-$, $Cu_2Cl_3^-$, $Cu_2Cl_2Br^-$, $Cu_2ClBr_2^-$, $Cu_2Br_3^-$, $AlCl_4^-$, $Al_2Cl_7^-$, $ZnCl_3^-$, $ZnCl_4^{2-}$, $Zn_2Cl_5^-$, $FeCl_3^-$, $FeCl_4^-$, $Fe_2Cl_7^-$, $TiCl_5^-$, $TiCl_6^{2-}$, $SnCl_5^-$, $SnCl_6^{2-}$, etc.

When the apparatus is used for storing phosphine or arsine, a preferred reactive liquid is an ionic liquid and the anion component of the ionic liquid is a cuprate or aluminate and the cation component is derived from an N,N'-dialkylimidazolium salt.

Gases having Lewis acidity to be stored in and delivered from Lewis basic reactive liquids, e.g., ionic liquids, may comprise one or more of boron, diborane, boron trifluoride, boron trichloride, silicon tetrafluoride, germane, german tetrafluoride, phosphorous trifluoride, phosphorous pentafluoride, arsenic pentafluoride, sulfur tetrafluoride, tin tetrafluoride, tungsten hexafluoride, molybdenum hexafluoride, hydrogen cyanide, hydrogen fluoride, hydrogen chloride, hydrogen iodide, hydrogen bromide, isotopically-enriched analogs, acidic organic or organometallic compounds, etc.

With reference to Lewis basic ionic liquids, which are useful for chemically complexing Lewis acidic gases, the anion or the cation component or both of such ionic liquids can be Lewis basic. In some cases, both the anion and cation are Lewis basic. Examples of Lewis basic anions include carboxylates, fluorinated carboxylates, sulfonates, fluorinated sulfonates, imides, borates, chloride, etc. Common anion forms include $BF_4^-$, $PF_6^-$, $AsF_6^-$, $SbF_6^-$, $CH_3COO^-$, $CF_3COO^-$, $CF_3SO_3^-$, p-$CH_3$—$C_6H_4SO_3^-$, $CH_3OSO_3^-$, $CH_3CH_2OSO_3^-$, $(CF_3SO_2)_2N^-$, $(NC)_2N^-$, $(CF_3SO_2)_3C^-$, chloride, and $F(HF)_n^-$. Other anions include organometallic compounds such as alkylaluminates, alkyl- or arylborates, as well as transition metal species. Preferred anions include $BF_4^-$, p-$CH_3$-$C_6H_4SO_3^-$, $CF_3SO_3^-$, $CH_3OSO_3^-$, $CH_3CH_2OSO_3^-$, $(CF_3SO_2)_2N^-$, $(NC)_2N^-$, $(NC)_2N^-$ $(CF_3SO_2)_3C^-$, $CH_3COO^-$ and $CF_3COO^-$.

Ionic liquids comprising cations that contain Lewis basic groups may also be used in reference to complexing gases having Lewis acidity. Examples of Lewis basic cations include N,N'-dialkyimidazolium and other rings with multiple heteroatoms. A Lewis basic group may also be part of a substituent on either the anion or cation. Potentially useful Lewis basic substituent groups include amine, phosphine, ether, carbonyl, nitrile, thioether, alcohol, thiol, etc.

Gases having Lewis acidity to be stored in and delivered from Lewis basic reactive liquids, e.g., ionic liquids, may comprise one or more of diborane, boron trifluoride, boron trichloride, $SiF_4$, germane, hydrogen cyanide, HF, HCl, HI, HBr, $GeF_4$, isotopically-enriched analogs, acidic organic or organometallic compounds, etc.

Examples of liquids bearing Lewis acid functional groups include substituted boranes, borates, aluminums, or alumoxanes; protic acids such as carboxylic and sulfonic acids, and complexes of metals such as titanium, nickel, copper, etc.

Examples of liquids bearing Lewis basic functional groups include ethers, amines, phosphines, ketones, aldehydes, nitriles, thioethers, alcohols, thiols, amides, esters, ureas, carbamates, etc. Specific examples of reactive covalent liquids include tributylborane, tributyl borate, triethylaluminum, methanesulfonic acid, trifluoromethanesulfonic acid, titanium tetrachloride, tetraethyleneglycol dimethylether, trialkylphosphine, trialkylphosphine oxide, polytetramethyleneglycol, polyester, polycaprolactone, poly(olefin-alt-carbon monoxide), oligomers, polymers or copolymers of acrylates, methacrylates, or acrylonitrile, etc. Often, though, these liquids suffer from excessive volatility at elevated temperatures and are not suited for thermal-mediated evolution. However, they may be suited for pressure-mediated evolution.

To effect the formation of the gas/liquid complex there is the step of contacting the reactive liquid with the respective Lewis gas under conditions for forming the complex, and to effect evolution of the gas from the reactive liquid for on site delivery it is necessary to break the complex (fragmentation). Each step in the process, either for formation of the complex or breaking of the complex requires mass transfer of the gas through the free surface of the bulk liquid. Mass transfer often is limited because some of the reactive liquids are viscous, thereby inhibiting mixing of Lewis gas with reactive liquid. The economy of the process is dependant on the ability to effect exchange of gas in and out of the reactive liquid of opposite Lewis character.

The present invention allows for fast complexing of the gas and an ionic liquid and a fast fragmentation of the complex and withdrawal and recovery of the Lewis gas from the reactive liquid/gas complex. In achieving formation of the complex of Lewis gas and reactive liquid or achieving recovery of the Lewis gas therefrom, the reactive liquid is contained or dispersed in a non-reacting solid matrix, or absorbent, or wick, herein referred to as a "wick", under conditions for physically holding or dispersing the reactive liquid in place within the containment vessel. It has been found that with the increased surface area of the absorbed or dispersed liquid, gas can be more readily transported for facilitating the formation and breaking of the complex between the gas and the ionic liquid.

Liquid loading of the wick material, expressed as the ratio of liquid weight to dry wick weight may range from 0.01 to 1000. In the liquid loading range 0.01 to 0.1 the liquid typically comprises a thin liquid coating on the surface of the solid wick. In the liquid loading range above 0.1 the liquid typically comprises a continuous liquid phase interpenetrating the solid wick material. For both loading ranges the liquid/solid system is defined herein as comprising a wick medium holding the reactive liquid and the reactive gas liquid complex therein.

A wide variety of wick media can be used to absorb or disperse reactive liquids. Limitations of prior art complexed gas apparatus are eliminated by absorbing or dispersing the ionic liquid in a solid matrix comprising for example having wicking capability. Possible wicks include but are not limited to polymer fabric such as woven or non-woven polypropylene or high density polyethylene fiber, various microporous membranes comprised of fluoropolymer or other polymer materials, hydrogel or aquagel liquid retention granules, various aerogels, various xerogels, sintered glass, sintered metals such as but not limited to sintered nickel, metal felt comprising fine metal fibers such as but not limited to nickel fibers, stainless steel fibers or fibers comprised of other metal alloys, woven metal fibers, woven or non-woven cellulose fibers, metal foams, and "super absorbent" polymers such as woven or non-woven polyacrylic fibers.

Such wicks have sufficient void volume to contain the ionic liquid in the existing vessel volume. Ionic liquid absorbed in a wick medium has extremely high gas/liquid interfacial area, thereby providing a minimum resistance to gas exchange. A liquid absorbed or dispersed in this manner cannot escape the cylinder or affect a phase barrier membrane. Various wick geometries can be anticipated, including but not limited to multiple fabric pads alternately layered with open polymer netting or other similar inert material herein referred to as a "spacer" to provide gas passages into the layered wick pads, a granular bed, and a bed comprising various structured shapes. Such geometries are inserted into a complexed gas apparatus vessel and wetted with ionic liquid. The complexed gas apparatus can thereafter operate in any vessel orientation without exposing the phase barrier membrane to liquid contact, or incurring pressure or flow fluctuations induced by subsurface hydrodynamic effects. The apparatus so improved may also operate closer to the theoretical limit of efficiency.

To facilitate an understanding of the formation and complexing process, in terms of the general description above, reference is made to the figures. FIG. 1 shows a preferred embodiment of a storage and dispensing apparatus 10 and FIG. 1A provides further detail as to a layered cylindrical wick designed for achieving the complexing or the breaking of the complex of Lewis gas and reactive liquid. The apparatus is comprised of a storage and dispensing vessel 12 such as a conventional gas cylinder container of elongate character. The interior is designed to retain a small quantity of free, or unabsorbed ionic liquid 14 of a suitable reactivity with the gas to be stored, and a head space 16 for non complexed gas.

Vessel 12 is provided at its upper end with a conventional cylinder gas valve 18 for regulating flow of gas into and out of cylinder 12. Valve 18 is provided with gas port 26 designed to affix the valve to any suitable gas supply or product delivery apparatus.

Disposed within vessel 12 and communicating with valve 18 is tube 20 further communicating with vent-type phase barrier device 22, herein referred to as a "vent". The vent contains a thin, microporous membrane designed to allow passage of gas while preventing liquid passage out of the vessel, and sealed against a hollow cylindrical support structure designed to hold the membrane. The membrane may comprise Teflon™ or other suitable medium that generally repels ionic liquid and which contains numerous pores generally smaller than 1 micrometer in size. In one alternative embodiment the vent may comprise a microporous medium including but not limited to microporous Teflon™ formed into any one of various shapes including but not limited to hollow tubes, disks and cylinders. In one embodiment of the invention, the absorbent material, such as non-woven polypropylene fiber is pre-treated using, for example a helium/argon plasma, or other chemical or physical pre-treatment to clean and advantageously affect the surface energy of the material. Such pre-treatment has been found to increase the absorbency of the material, thereby improving the ability of the material to hold reactive liquid.

Liquid 14 is shown as disposed in the low point of a vertically oriented cylinder. Liquid 14 in a horizontally or otherwise oriented cylinder would be located in the corresponding low point, but would be of insufficient quantity to contact the membrane surface of vent 22.

Further disposed within cylinder 12 is a cylindrical wick structure comprised of multiple layers of fabric-type absorbent wick 30 and spacers 32 arranged concentrically about a centrically located cylindrical support spacer 34. Spacers 32 separate the fabric layers 30, thereby providing easy passage of Lewis gas to both surfaces of the wetted fabric layers. Gas flow paths are represented as arrows in FIG. 1.

One non-woven polypropylene fabric has been found to have a porosity of approximately 89% and a liquid capacity of approximately five times its own weight in a boron trifluoride reactive ionic liquid. The greater portion, e.g., >80%, more preferably >90%, still more preferably >95% of the ionic liquid contained in cylinder 12 is absorbed or dispersed in wick 30. The remainder is unsupported ionic liquid 14.

FIG. 1A shows an exploded view of the multi-layered wick structure, further illustrating central cylindrical support spacer 34, and the repeating layers of wick 30 and spacer 32.

Other similar embodiments of the wick structure shown in FIGS. 1 and 1A can be anticipated, including but not limited to a single wick layer and a single spacer layer formed into a cylindrical structure by spiral winding around a central cylindrical support spacer.

In another similar embodiment of the wick structure shown in FIGS. 1 and 1A, either single or multiple layers of wick and spacer are folded into a pleated structure wherein the pleats are oriented along the cylinder axis to provide maximum wick volume, maximum layer surface, and maximum system capacity. "System capacity" as referred to herein pertains to the total quantity of ionic liquid and complexed gas contained in a fully charged complexed gas system.

In another similar embodiment of the wick structure shown in FIGS. 1 and 1A, individual wicking "sticks" are first formed by inserting wick material into thin spacer tubes comprised of open polypropylene netting or other similar inert material having relatively small diameter compared to cylinder 12. Multiple sticks are then inserted into cylinder 12 to form a complete structure having maximum system capacity.

Figure 2:
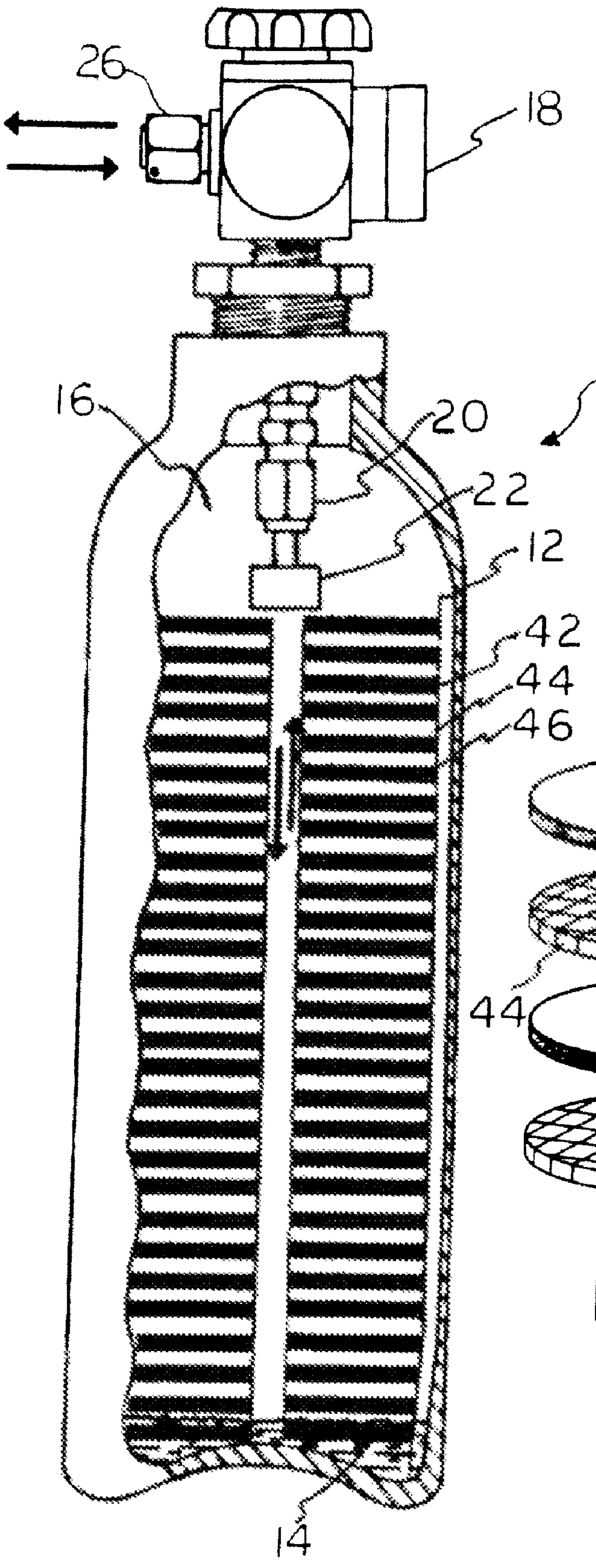
FIGS. 2 and 2A are views of an apparatus for effecting formation of complexes and for recovery of Lewis gases with reactive liquids of opposite Lewis character using a layered stacked wick.
Figure 2A:
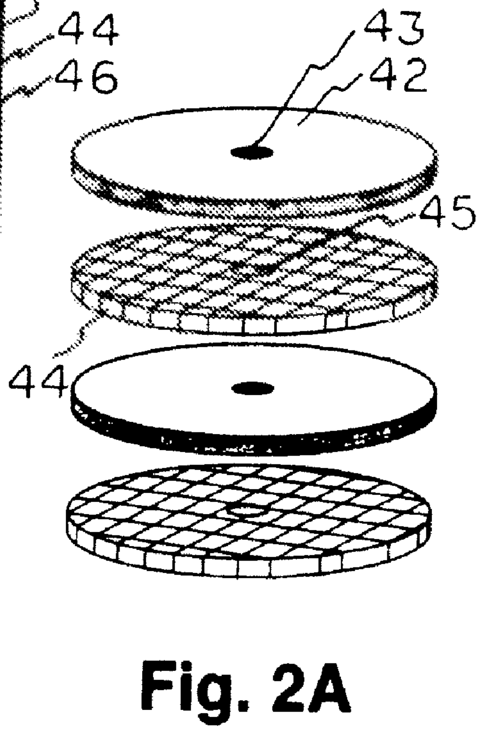

FIG. 2 shows another preferred embodiment of a storage and dispensing apparatus 40 and FIG. 2A provides further detail as to a layered stacked wick designed for achieving the complexing or the fragmentation of the complex of Lewis gas and reactive liquid. Disposed within cylinder 12 is a cylindrical wick structure comprised of multiple layers of fabric-type absorbent wick 42 and spacers 44 stacked axially within the cylinder. The wick and spacer stack is located within a cylindrical spacer layer 46 which is located adjacent to the internal surface of the cylinder. Wick layers 42 and spacers 44 are provided with centrally located holes 43 and 45 respectively. Spacers 44 separate the fabric layers 42, thereby providing easy passage of Lewis gas to both surfaces of the wetted fabric layers. Central holes 43 and 45 and spacer layer 46 provide easy passage of Lewis gas in an axial direction within the vessel.

FIG. 2A shows an exploded view of only several layers the multi-layered wick structure, further illustrating the centrally located holes 43 and 45.

Other similar embodiments of the wick structure shown in FIGS. 2 and 2A can be anticipated, including but not limited to a stack formed by folding wick and spacer material into a pleated structure wherein the pleats are oriented radially to form a bellows-type stacked disc geometry.

The embodiment shown in FIGS. 2 and 2A provides an advantage over the embodiment in FIGS. 1 and 1A. Wicks absorb liquids through capillary action. The height L to which a liquid can rise in a capillary is limited by the liquid surface tension γ, the liquid density δ and the capillary radius (or pore dimension) r in the following way:

$$L=2\gamma/(\delta g r),$$

where g is the gravitational constant. Taller wicks are therefore limited in their capacity to hold liquid by the liquid physical properties and by their own pore size. This limits the overall liquid capacity of the wick in a complexed gas apparatus. Stacked disc structures of the type shown in FIGS. 2 and 2A do not require the liquid to rise as far in the absorbent medium. Indeed, when the cylinder is oriented vertically as shown in FIGS. 2 and 2A, the liquid, held independently in each disc, need only rise to the thickness of each disc. This maximizes the overall liquid capacity of the system.

Figure 3:
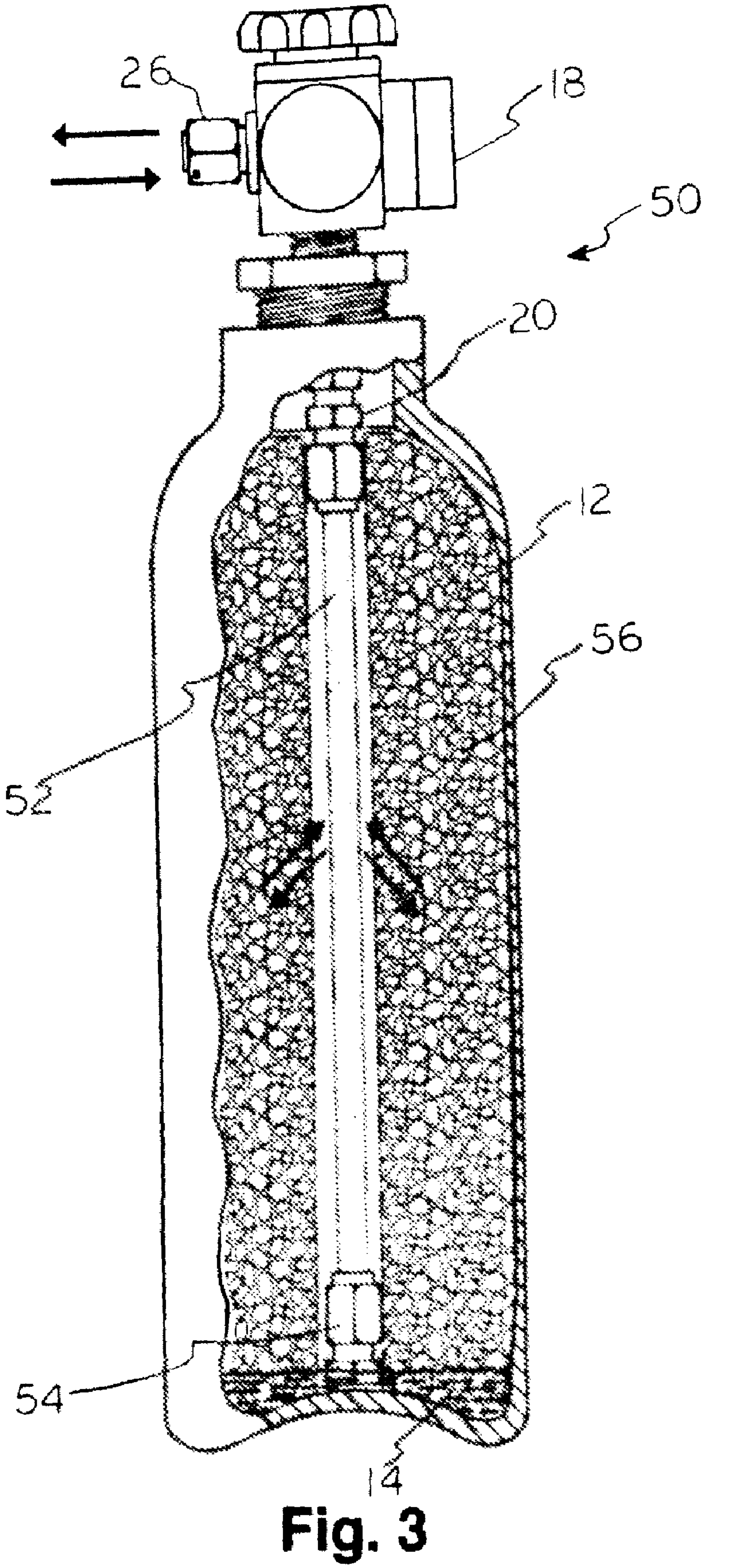
FIG. 3 is a view of an apparatus for effecting formation of complexes and for recovery of Lewis gases with reactive liquids of opposite Lewis character using a granular absorbent bed.

FIG. 3 shows another preferred embodiment of a storage and dispensing apparatus 50 for complexing or fragmenting the complex of Lewis gas and reactive liquid. Disposed within cylinder 12 is a wick bed 56 comprising a granular bed or a bed comprising various structural shapes. Structural shapes may be dumped randomly in cylinder 12 or arranged in an orderly pattern.

FIG. 3 also shows an alternative vent embodiment comprising a microporous tube 52 in communication with tube 20. Microporous tube 52 is contained in bed 56 and sealed distally with cap assembly 54. Other vent designs may also be combined with this wick bed embodiment.

While specific embodiments have been described in details, those with ordinary skill in the art will appreciate that various modifications and alternatives to those details could be developed in light of the overall teaching of the disclosure. Accordingly, the particular arrangements disclosed are meant to be illustrative only and not limitings to the scope of the invention, which is to be given the full breath of the appended claims and any all equivalents thereof.

The invention claimed is:

1. An apparatus for effecting storage and delivery of a gas, the storage and delivery apparatus comprised of a storage and dispensing vessel containing a medium capable of storing a gas and permitting delivery of the gas stored in the medium from the vessel, the improvement comprising:

(a) a reactive liquid having Lewis acidity or basicity;

(b) a gas liquid complex in a reversible reacted state formed under conditions of pressure and temperature by contacting the gas having Lewis acidity with the reactive liquid having Lewis basicity or the gas having Lewis basicity with the reactive liquid having Lewis acidity;

(c) a non-reactive wick medium holding and dispersing the reactive liquid and the gas liquid complex therein.

2. The apparatus of claim 1 wherein the non-reactive wick medium is selected from the group consisting of: polymer fabric, woven or non-woven polypropylene, high density polyethylene fiber, microporous membrane of fluoropolymer or other polymer materials, hydrogel, aquagel liquid retention granule, aerogels, xerogels, sintered glass, sintered metal, metal felt of fine metal fibers, stainless steel fibers, fibers of metal alloys, woven metal fibers, woven or non-woven cellulose fibers, metal foams, super absorbent polymers and the mixture therefore.

3. The apparatus of claim 1 wherein the non-reactive wick medium has a structure with multiple wick pads alternately layered with open spacers and a cylindrical support spacer oriented in an axial direction within the vessel, wherein the wick pads and the open spacer are having structures selected from the group consisting of cylindrical layers around a centrally located cylindrical support spacer, circular plates with central holes stacked axially within an outer cylindrical support spacer, and a pleated structure wherein the pleats are oriented along the cylinder axis to provide maximum wick volume, maximum layer surface and maximum system capacity.

4. The apparatus of claim 1 wherein the non-reactive wick medium has a single wick layer and a single spacer layer formed into a cylindrical structure by spiral winding around a central cylindrical support spacer.

5. The apparatus of claim 4, wherein the single wick layer and the single spacer layer are folded into a pleated structure wherein the pleats are oriented along the central axis of the cylindrical structure to provide maximum wick volume, maximum layer surface and maximum system capacity.

6. The apparatus of claim 1, wherein the non-reactive wick medium has a structure with the vessel filled with multiple wicking sticks formed by inserting wick medium into thin spacer tubes of inert netting material to have maximum system capacity.

7. The apparatus of claim 1 wherein the non-reactive wick medium is a wick granular bed or a wick bed with various structural shapes arranged randomly or in an orderly pattern along a centrally located cylindrical support spacer optionally containing a centrally located microporous tube.

8. The apparatus of claim 1 wherein the non-reactive wick medium has a single wick layer and a single spacer layer folded into a pleated structure wherein the pleats are oriented radically to form a bellows-type cylindrical structure.

9. The apparatus of claim 1 wherein the reactive liquid has a vapor pressure below about $10^{-2}$ Torr at 25° C.

10. The apparatus of claim 1 wherein the Lewis acidic gas is selected from the group consisting of boron trifluoride, boron trichloride, diborane, borane, silicon tetrafluoride, germanium tetrafluoride, germane, phosphorous trifluoride, phosphorous pentafluoride, arsenic pentafluoride, sulfur tetrafluoride, tin tetrafluoride, tungsten hexafluoride, molybdenum hexafluoride, hydrogen cyanide, hydrogen fluoride, hydrogen chloride, hydrogen iodide, hydrogen bromide, isotopically-enriched analogs and mixtures thereof.

11. The apparatus of claim 1 wherein the Lewis basic gas is selected from the group consisting of phosphine, arsine, stibine, ammonia, hydrogen sulfide, hydrogen selenide, hydrogen telluride, isotopically-enriched analogs, basic organic or organometallic compounds and mixtures thereof.

12. The apparatus of claim 1 wherein the reactive liquid is an ionic liquid.

13. The apparatus of claim 12 wherein the ionic liquid is comprised of a salt selected from the group consisting of alkylphosphonium, alkylammonium, tetra alkylphosphonium, tetra alkylammonium N-alkylpyridinium, N,N-dialkylpyrrolidinium, N,N'-dialkylimidazolium cations and the mixture therefore.

14. The apparatus of claim 13 wherein the ionic liquid having Lewis acidity is comprised of a anion component from a metal halide selected from the group consisting of copper, aluminum, iron, zinc, tin, antimony, titanium, niobium, tantalum, gallium, and indium halide and the mixture therefore.

15. The apparatus of claim 14 wherein the anion component is selected from the group consisting of $CuCl_2^-$, $CuBr_2^-$, $CuClBr^-$, $Cu_2Cl_3^-$, $Cu_2Cl_2Br^-$, $Cu_2ClBr_2^-$, $Cu_2Br_3^-$, $AlCl_4^-$, $Al_2Cl_7^-$, $ZnCl_3^-$, $ZnCl_4^{2-}$, $Zn_2Cl_5^-$, $FeCl_3^-$, $FeCl_4^-$, $Fe_2Cl_7^-$, $TiCl_5^-$, $TiCl_6^{2-}$, $SnCl_5$, and $SnCl_6^{2-}$, and the mixture therefore.

16. The apparatus of claim 13 wherein the ionic liquid having Lewis basicity is selected from the group consisting of carboxylates, fluorinated carboxylates, sulfonates, fluorinated sulfonates, imides, borates, halides and the mixture therefore.

17. The apparatus of claim 16 wherein the ionic liquid having Lewis basicity is comprised of an anion component selected from the group consisting of $BF_4^-$, $PF_6^-$, $AsF_6^-$, $SbF_6^-$, $CH_3COO^-$, $CF_3COO^-$, $CF_3SO_3^-$, $CH_3OSO_3^-$, $CH_3CH_2OSO_3^-$, p-$CH_3$—$C_6H_4SO_3^-$, $(CF_3SO_2)_2N^-$, $(NC)_2N^-$, $(CF_3SO_2)_3C^-$, chloride, $F(HF)_n$ and the mixture therefore.

18. A process for effecting storage and delivery of a gas within a storage and delivery apparatus comprised of a storage and dispensing vessel containing a medium capable of storing a gas and permitting delivery of the gas stored in the medium from the vessel, the improvement comprising:

(a) storing a reactive liquid having Lewis acidity or basicity in a non-reactive wick medium;

(b) storing a gas liquid complex in a reversible reacted state formed under conditions of pressure and temperature by contacting the gas having Lewis acidity with the reactive liquid having Lewis basicity or the gas having Lewis basicity with the reactive liquid having Lewis acidity in the non-reactive wick medium.

19. The process of claim 18 wherein the non-reactive wick medium is selected from the group consisting of polymer fabric, woven or non-woven polypropylene, high density polyethylene fiber, microporous membrane of fluoropolymer or other polymer materials, hydrogel, aquagel liquid retention granule, aerogels, xerogels, sintered glass, sintered metal, metal felt of fine metal fibers, stainless steel fibers, fibers of metal alloys, woven metal fibers, woven or non-woven cellulose fibers, metal foams, super absorbent polymers and mixtures thereof.

20. The process of claim 18 wherein the non-reactive wick medium has a structure with multiple wick pads alternately layered with open spacers and a cylindrical support spacer oriented in an axial direction within the vessel, wherein the wick pads and the open spacer are having structures selected from the group consisting of cylindrical layers around a centrally located cylindrical support spacer, circular plates with central holes stacked axially within an outer cylindrical support spacer, and a pleated structure wherein the pleats are oriented along the cylinder axis to provide maximum wick volume, maximum layer surface and maximum system capacity.

21. The process of claim 18 wherein the non-reactive wick medium has a single wick layer and a single spacer layer formed into a cylindrical structure by spiral winding around a central cylindrical support spacer.

22. The process of claim 21, wherein the single wick layer and the single spacer are folded into a pleated structure wherein the pleats are oriented along the central axis of the cylindrical structure to provide maximum wick volume, maximum layer surface and maximum system capacity.

23. The process of claim 18 wherein the non-reactive wick medium is a wick granular bed or a wick bed with various structural shapes arranged randomly or in an orderly pattern along a centrally located cylindrical support spacer optionally containing a centrically located microporous tube.

24. The process of claim 18, wherein the non-reactive wick medium has a single wick layer and a single spacer folded into a pleated structure wherein the pleats are oriented radically to form a bellows-type cylindrical structure.

25. The process of claim 18, wherein the non-reactive wick medium has a structure with the vessel filled with multiple wicking sticks formed by inserting wick medium into thin spacer tubes of inert netting material to have maximum system capacity.

* * * * *